United States Patent [19]
Bergquist et al.

[11] Patent Number: 5,661,680
[45] Date of Patent: Aug. 26, 1997

[54] AN ANALOG OUTPUT BUFFER CIRCUIT

[75] Inventors: Mark Andrew Bergquist, Rochester; David Peter Swart, Pine Island, both of Minn.

[73] Assignee: International Business Machines Corporation, Armonk, N.Y.

[21] Appl. No.: 709,902

[22] Filed: Sep. 9, 1996

[51] Int. Cl.$^6$ .................................................. G11C 13/00
[52] U.S. Cl. .................................... 365/149; 365/189.05
[58] Field of Search ........................ 365/45, 149, 226, 365/189.05, 230.08

[56] References Cited

U.S. PATENT DOCUMENTS

| | | | |
|---|---|---|---|
| 3,912,949 | 10/1975 | Kalisvaart | 307/280 |
| 4,543,494 | 9/1985 | Wakimoto | 307/200 B |
| 5,307,471 | 4/1994 | Ishikawa | 365/49 |
| 5,334,889 | 8/1994 | Hisaka | 307/475 |
| 5,357,211 | 10/1994 | Bryson et al. | 330/263 |
| 5,408,150 | 4/1995 | Wilcox | 327/108 |

*Primary Examiner*—Terrell W. Fears
*Attorney, Agent, or Firm*—Felsman, Bradley, Gunter & Dillon, L.L.P.

[57] ABSTRACT

An analog output buffer circuit having a low quiescent power dissipation and a high current-driving capability is disclosed. In accordance with a preferred embodiment of the present invention, the analog output buffer circuit includes a capacitor and three transistors. The first transistor is coupled between a power supply and an output. The gate of the first transistor is utilized for receiving input signals. The second transistor is coupled between the output and ground. The capacitor is coupled between a gate of the first transistor and a gate of the second transistor such that voltages at the gate of the first transistor are related to voltages at the gate of the second transistor via the capacitor. Finally, the third transistor is coupled between the gate of the second transistor and a current source. This configuration allows the analog output buffer circuit to have a high current-driving capability while maintaining a low power dissipation during the quiescent period.

15 Claims, 7 Drawing Sheets

AN ANALOG OUTPUT BUFFER CIRCUIT

BACKGROUND OF THE INVENTION

1. Technical Field

The present invention relates to an output buffer circuit in general and, in particular, to an analog output buffer circuit for servo applications. Still more particularly, the present invention relates to an analog output buffer circuit having a high drive capability and a low quiescent power dissipation.

2. Description of the Prior Art

In a disk drive, two different sets of electronic circuits are utilized to read a sequence of four short burst signals originated from a disk surface in order to obtain information as to the location of a read/write head with respect to a track center. A set of four peak-hold circuits is first employed to capture and store the peak amplitude of these four burst signals, with one peak-hold circuit per burst signal. The peak amplitude of each of these burst signals, typically ranging from 0.0 to 1.5 volts, is sustained at an output of their respective peak-hold circuit. A set of four output buffer circuits is then employed to buffer and transfer each individual output voltage signal from the peak-hold circuit to a corresponding load capacitor. Subsequently, a servo system within the disk drive will act upon the voltage signals in the load capacitors for moving the read/write head to the track center, if necessary.

Typically, the peak-hold circuits and the output buffer circuits are incorporated within an integrated circuit (IC) device. Due to their sizes, the load capacitors are generally connected external to the IC device. One requirement for the on-chip output buffer circuits is that they be able to quickly charge and discharge a voltage signal to and from their respective off-chip load capacitor after the voltage signals have been utilized. This allows the on-chip output buffer circuits to be ready to respond to a next set of burst signals.

Figure 1:
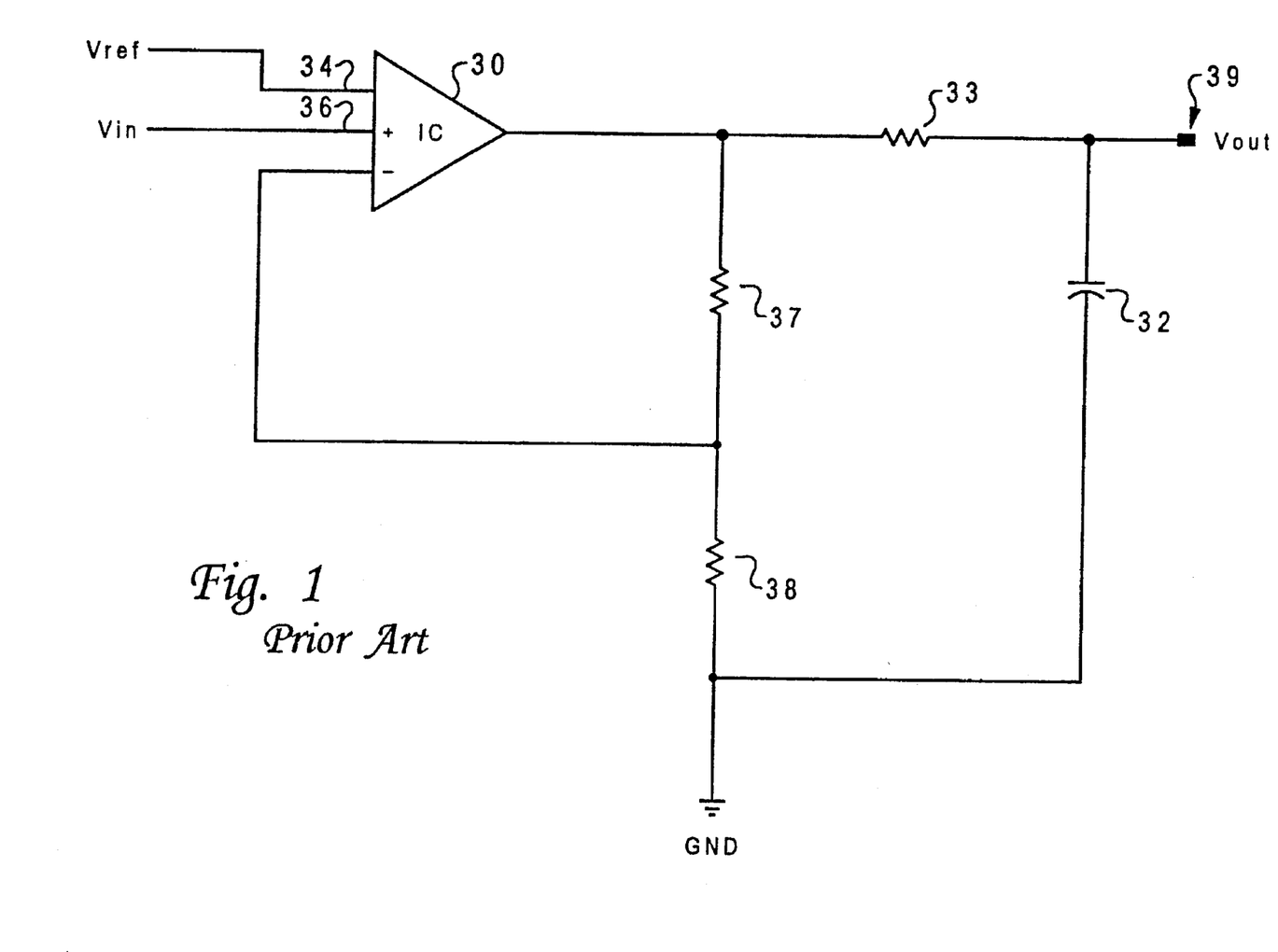
FIG. 1 is a schematic diagram of an IC device, in which output buffer circuits are incorporated, and an off-chip load capacitor.

Referring now to the drawings and in particular to FIG. 1, there is illustrated a schematic diagram of an IC device, in which output buffer circuits are incorporated, along with an off-chip load capacitor. As shown, IC device 30 is connected to a resistor 33 and an off-chip load capacitor 32 in which voltage signals output from IC device 30 are being stored. In addition, resistor 37 and resistor 38 comprise a feedback network around IC device 30. Input $V_{ref}$ 34 is a reference voltage that establishes the operating current in all of the output buffer circuits within IC device 30. The burst signals are applied to input $V_{in}$ 36 and subsequently appear at output $V_{out}$ 39. The voltage waveform of output $V_{out}$ 39 is similar to that of input $V_{in}$ 36, except with a voltage gain due to the voltage dividing action provided by resistors 37 and 38. For example, if resistor 37 is 10.0 K$\Omega$ and resistor 38 is 15.0 K$\Omega$, the voltage gain would be approximately 1.67.

During the normal operation of IC device 30, DC power is being continuously consumed by each output buffer circuit in order to maintain a constant output voltage. This DC power consumption must be maintained at quite a high current level (about 2500 µA) in order to allow the output buffer circuit to charge or discharge load capacitor 32 within an acceptable time limit of about 1 µs. However, any time the output voltage is not utilized for charging load capacitor 32, the idle DC power consumption would be considered wasted power. On the contrary, if a lower DC power, such as 300 µA or less, is supplied to the output buffer circuit instead, then the output buffer circuit would take more than 10 µs to charge or discharge the same load capacitor 32. This time penalty will adversely affect the overall performance of the application for which the output buffer circuit is intended.

Consequently, it would be desirable to provide an improved analog output buffer circuit having a high drive capability and yet with a low quiescent power dissipation.

SUMMARY OF THE INVENTION

In view of the foregoing, it is therefore an object of the present disclosure to provide an improved output buffer circuit.

It is another object of the present disclosure to provide an improved analog output buffer circuit for servo application.

It is yet another object of the present disclosure to provide an improved analog output buffer circuit having a high drive capability while maintaining a low quiescent power dissipation.

In accordance with a preferred embodiment of the present invention, the analog output buffer circuit includes a capacitor and three transistors. The first transistor is coupled between a power supply and an output. The gate of the first transistor is utilized to receive input signals. The second transistor is coupled between the output and ground. The capacitor is coupled between a gate of the first transistor and a gate of the second transistor such that voltages at the gate of the first transistor are related to voltages at the gate of the second transistor via the capacitor. Finally, the third transistor is coupled between the gate of the second transistor and a current source. This configuration allows the analog output buffer circuit to have a high current-driving capability while maintaining a low power dissipation during the quiescent period.

All objects, features, and advantages of the present disclosure will become apparent in the following detailed written description.

BRIEF DESCRIPTION OF THE DRAWINGS

The disclosure itself, as well as an illustrative mode of use, further objects, and advantages thereof, will best be understood by reference to the following detailed description of an illustrative embodiment when read in conjunction with the accompanying drawings, wherein.

DETAILED DESCRIPTION OF A PREFERRED EMBODIMENT

The output buffer circuit as described in the present invention is designed for a servo application to be implemented in a disk drive. However, it is understood that the features of the output buffer circuit according to the present invention may be applicable to any application in which an analog output buffer circuit is required.

Figure 2:
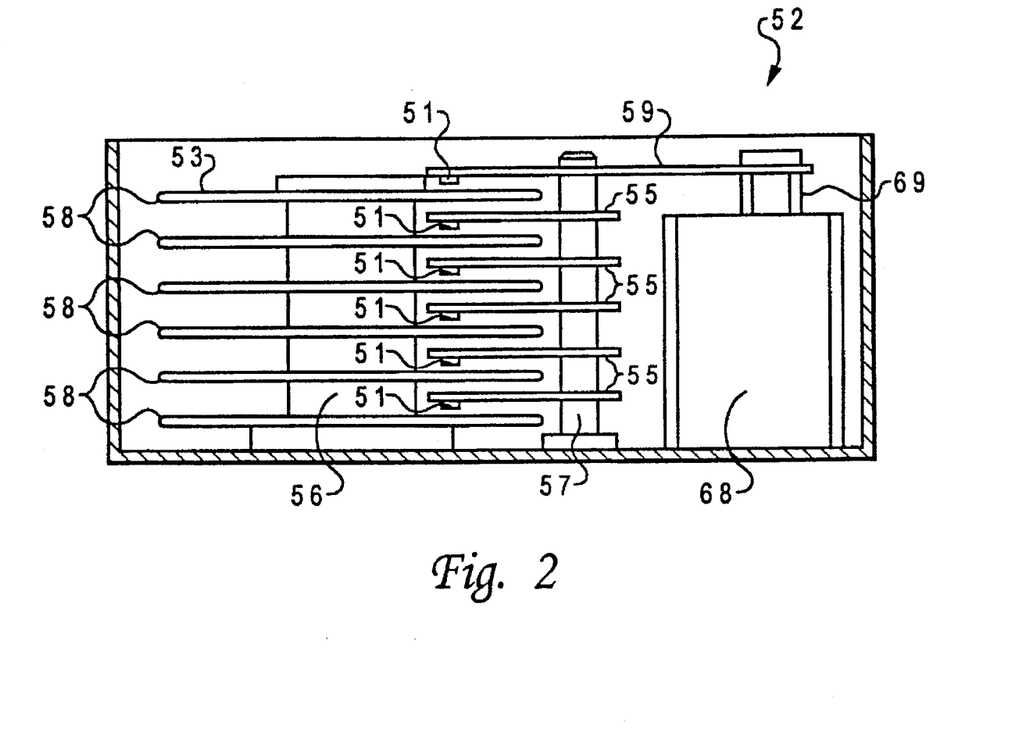
FIG. 2 is a pictorial diagram of a disk drive in which the IC device of FIG. 1 may be incorporated.
Figure 3:
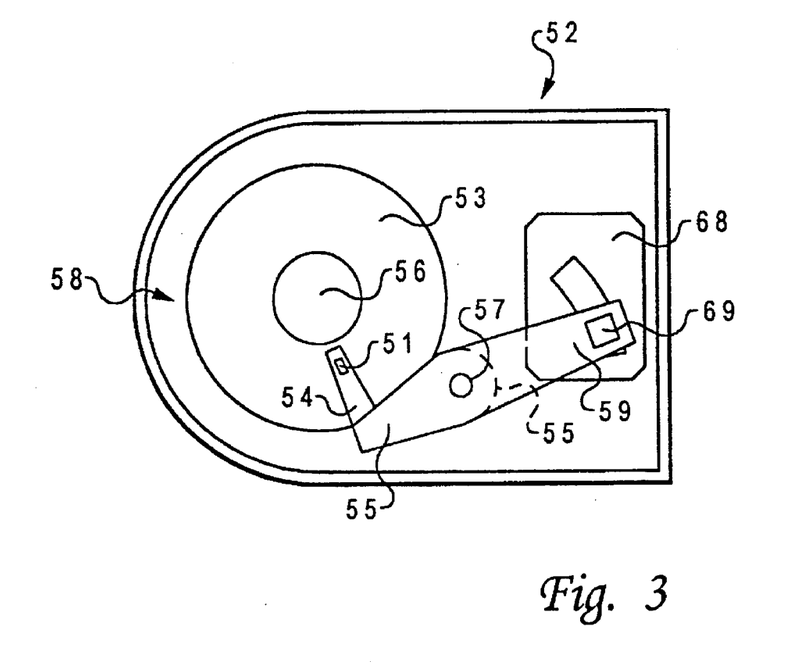
FIG. 3 is a top cross-sectional view of the disk drive in FIG. 2.

With reference now to FIGS. 2 and 3, there is illustrated a disk drive 52 in which the IC device of FIG. 1 may be incorporated. Disk drive 52 includes a stack of disks 58, each disk having at least one magnetic surface 53. Disks 58 are mounted in parallel for simultaneous rotation on and by an integrated spindle and motor assembly 56. Data information on each of disks 58 are read from or written to by a corresponding read/write head 51 movable across magnetic surface 53.

Read/write heads 51 are mounted on flexure springs 54 carried by arms 55 ganged together for simultaneous pivotal movement about a support 57. One of the arms 55 includes an extension 59 driven in a pivotal motion by a head drive motor 68. Although several drive arrangements may be utilized, head drive motor 68 commonly includes a voice coil 69 cooperating with a magnet and core assembly (not shown) operatively controlled for moving read/write heads 51 in synchronism in a radial direction in order to position read/write heads 51 in registration with data cylinders to be followed.

Figure 4:
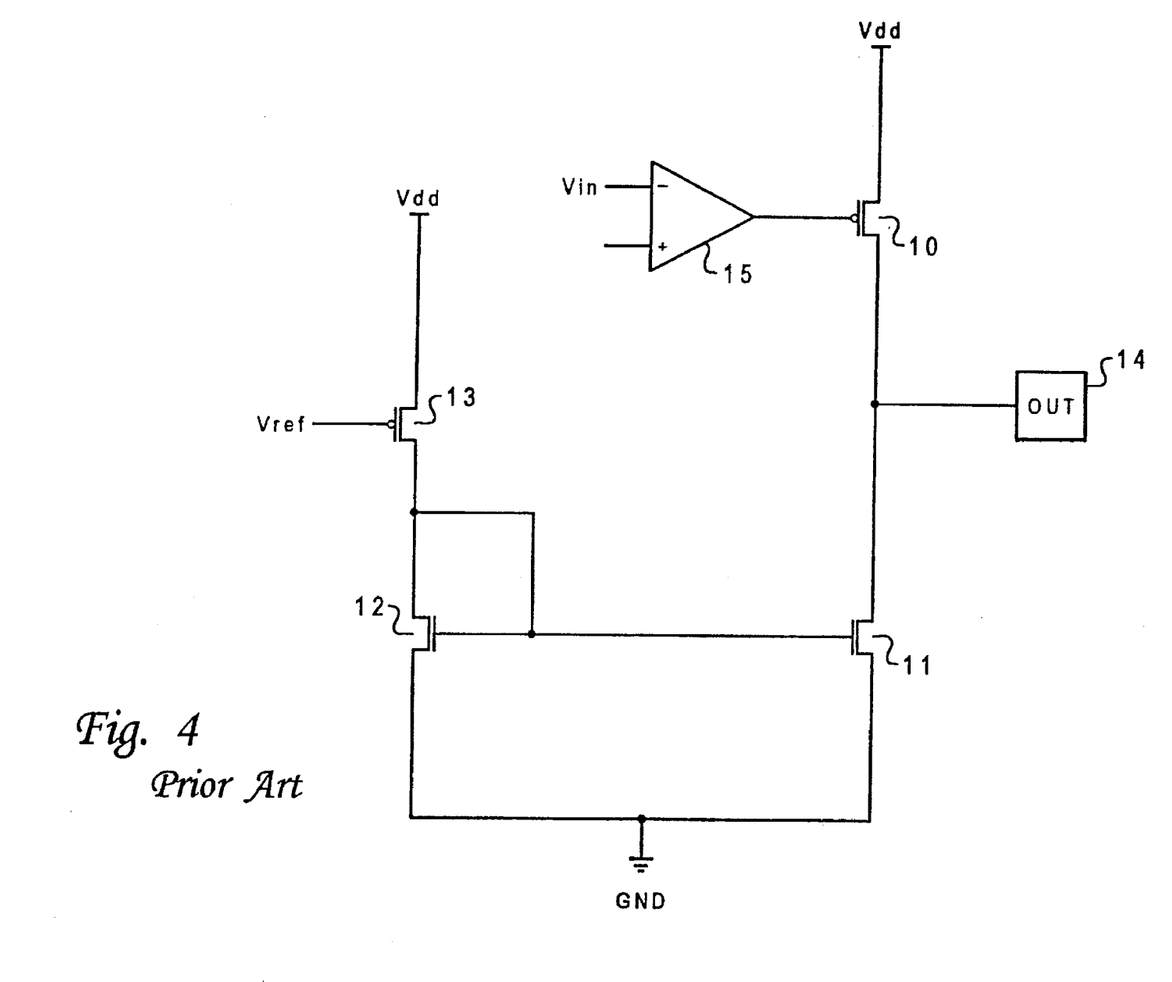
FIG. 4 is a schematic diagram of an analog output buffer according to prior art.

With reference now to FIG. 4, there is illustrated an analog output buffer according to prior art. As shown, p-channel transistor 10 is connected in series with n-channel transistor 11 between power supply, $V_{dd}$ and Ground. The drain of transistor 10 and the drain of transistor 11 are both connected to an output 14. The gate of transistor 10 is connected to a differential amplifier 15 while the gate of transistor 11 is connected to the gate and drain of n-channel transistor 12. Transistor 12 is also connected in series with p-channel transistor 13 between $V_{dd}$ and Ground. The gate of transistor 13 is connected to a reference voltage, $V_{ref}$.

During normal operation, transistor 11 continuously sinks a constant current, as determined by a reference voltage, $V_{ref}$, applying to the gate of transistor 13 and the size of transistors 11–13. Transistor 10 is an inverting p-channel transistor, driven at the gate by differential amplifier 15. When a more positive output voltage is called for at buffer output 14, the voltage at the gate of transistor 10 goes negative, thus increasing the current supplied from $V_{dd}$ through transistor 10. Conversely, when a more negative output voltage is called for at buffer output 14, the voltage at the gate of transistor 10 goes more positive, thus decreasing the current supplied from $V_{dd}$ through transistor 10. In both of these cases, however, the current sank by transistor 11 remains constant.

Figure 5:
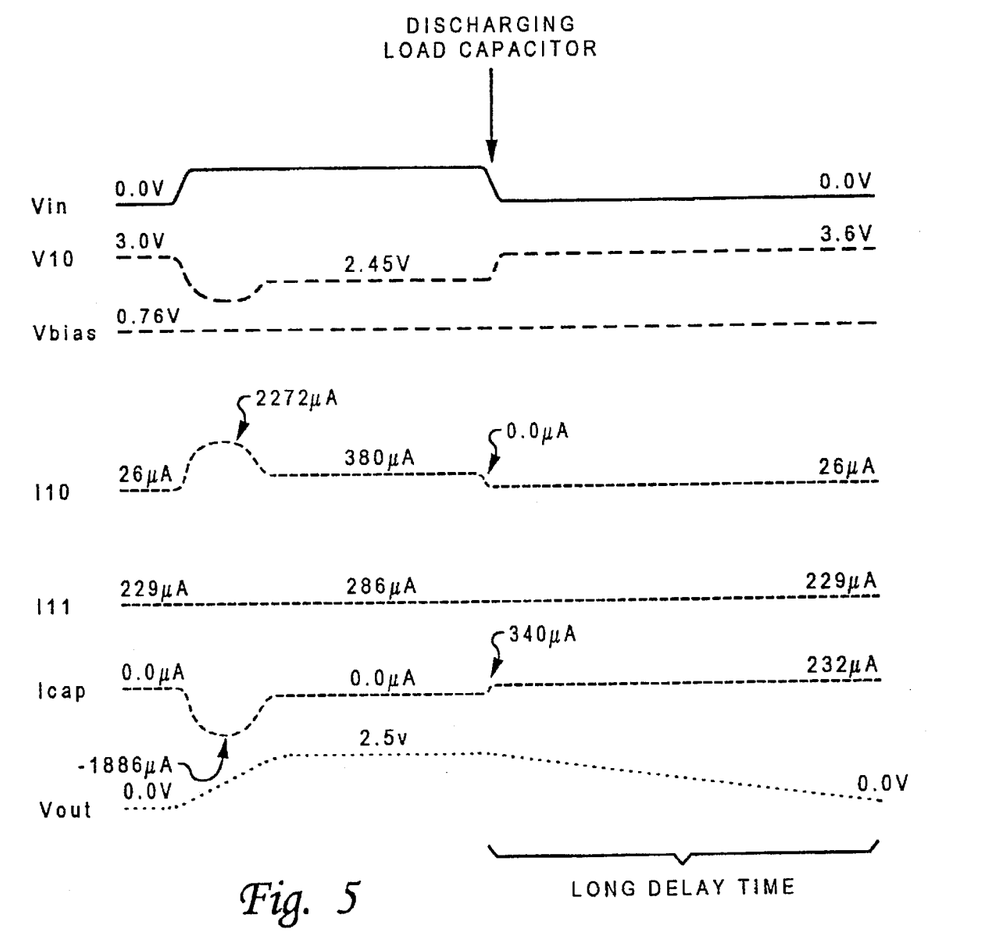
FIG. 5 is a depiction of a series of voltage and current waveform diagrams for various nodes of the output buffer circuit of FIG. 4.

Referring now to FIG. 5, there is depicted a series of voltage and current waveform diagrams for various nodes of the output buffer circuit of FIG. 4. The input voltage, $V_{in}$, may range between 0.0 V to 1.5 V, as dictated by the amplitude of the burst signals. The voltage waveform $V_{10}$ at the gate of transistor 10 (or at the output of differential amplifier 15) is a response to the input voltage waveform, $V_{in}$. The bias voltage, $V_{bias}$ at the gate of transistors 11 and 12 is normally maintained at a constant level of approximately 0.76 V throughout.

The discharging of the load capacitor occurs when the input voltage, $V_{in}$, drops from 1.5 volts back to 0.0 volt. The current in transistor 10, $I_{10}$, then drops from approximately 380 µA to 0.0 µA when the input voltage is falling such that it will not oppose the rapid discharge of the load capacitor. $I_{11}$ is the current in transistor 11. In a low quiescent current operating mode, the quiescent current in transistor 11 is approximately 286 µA. In order to maintain this low level of power consumption, $I_{11}$ will not be increased to assist the rapid discharge of the load capacitor. $I_{cap}$ is the current within the load capacitor and it is slowly discharging after $V_{in}$ started dropping from 1.5 volts to 0.0 volt. In the meantime, output voltage, $V_{out}$, at buffer output 14 also slowly decreases from 2.5 volts back to 0.0 volt.

As shown, it is apparent that the length of time to discharge the load capacitor is quite long under this power mode. This is attributed to the fact that transistor 11 is only conducting approximately 286 µA even during the discharge of the load capacitor. However, if the current level through transistor 11 is increased to match with the maximum current required for discharging the load capacitor, then a significant amount of power would be wasted when the discharge duty cycle is low.

Figure 6:
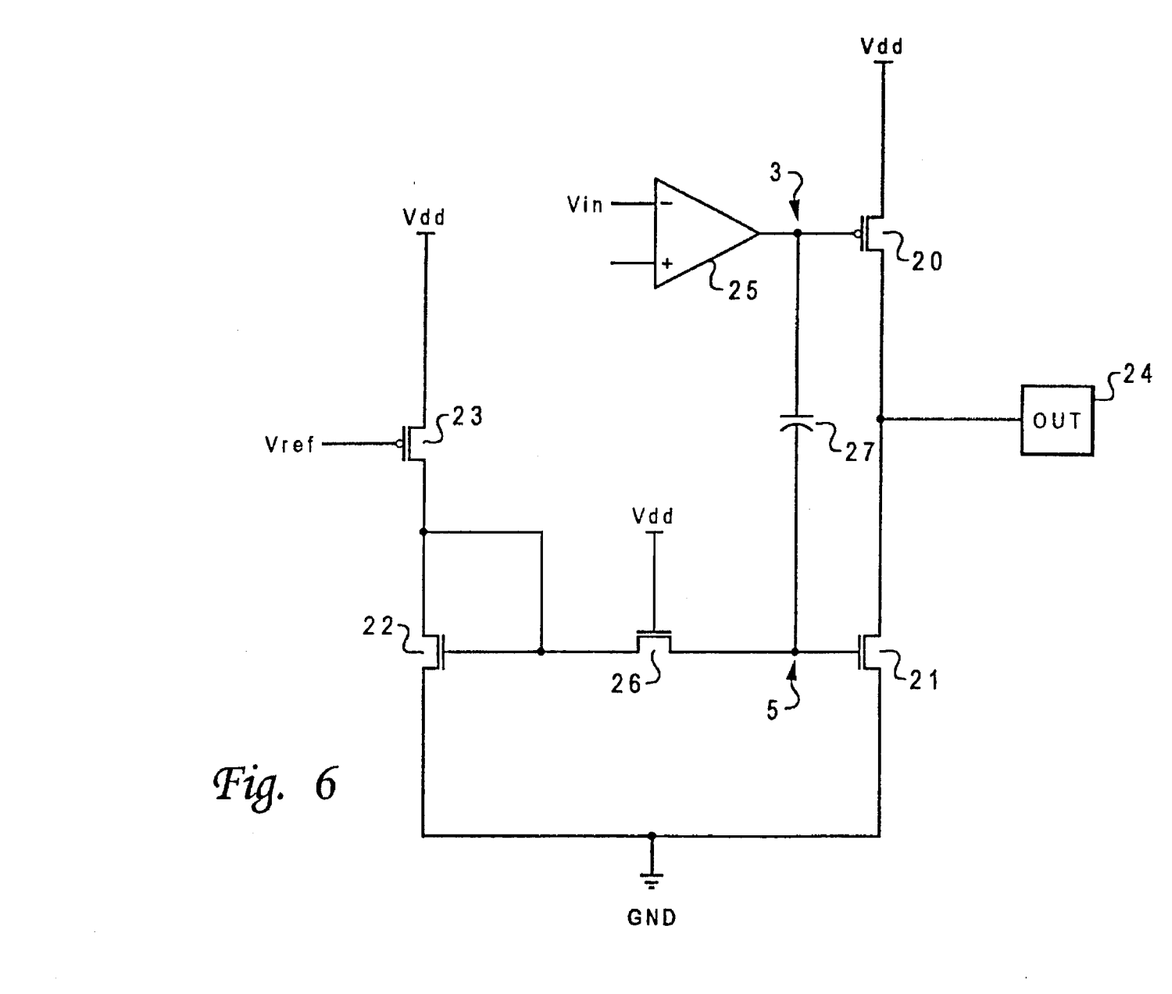
FIG. 6 is a schematic diagram of an analog output buffer according to a preferred embodiment of the invention.

With reference now to FIG. 6, there is illustrated an analog output buffer according to a preferred embodiment of the invention. As shown, a p-channel transistor 20 is connected in series with an n-channel transistor 21 between power supply, $V_{dd}$ and Ground. The drain of transistor 20 and the drain of transistor 21 are both connected to an output 24. A capacitor 27 is connected between the gate of transistor 20 and the gate of transistor 21. The gate of transistor 20 is also connected to the output of a differential amplifier 25. Between the gates of transistor 21 and transistor 22, there is connected an n-channel transistor 26. Transistor 22 is also connected in series with p-channel transistor 23 between Ground and $V_{dd}$. The gate of transistor 23 is connected to a reference voltage, $V_{ref}$, while the gate of transistor 26 is connected to $V_{dd}$. Further, the gate and drain of transistor 22 are coupled together.

As a preferred embodiment of the invention, n-channel transistor 26 is configured to be long and narrow (e.g., W=2.4, L=20) and is biased in its linear region such that transistor 26 may act like a resistor. Together, capacitor 27 and transistor 26 form an RC network at node 5 (the gate of transistor 21), with an RC time constant long enough to sustain a temporary but huge current drain via transistor 21 until the load capacitor is fully discharged. Capacitor 27 couples node 5 to node 3 such that the gate voltage of transistor 21 is modulated by the voltage changes at node 3.

Now, when a more positive voltage is called for at buffer output 24, node 3 is driven to be more negative by differential amplifier 25. In turn, node 5 also becomes more negative via a bootstrapping effect by capacitor 27. The current through transistor 20 then increases, but the current sank (i.e., current wasted) by transistor 21 is reduced. As a result, the load capacitor will be charged more quickly under the same amount of power supply current.

Conversely, when the charges within load capacitor need to be discharged, node 3 is driven to be more positive by differential amplifier 25 in order to turn transistor 20 off. Capacitor 27 then couples the rising edge of the voltage at node 3 to node 5 such that transistor 21 is turned on harder to pull the charges out of the load capacitor.

Under the present invention, the value of quiescent current within transistor 21 can be reduced to save power, but at the same time, the output buffer circuit is still capable of rapidly charging and discharging the load capacitor. The RC time constant of capacitance 27 and transistor 26 can be designed to accommodate the amount of charges to be withdrawn from the load capacitor. After several RC time constants, the voltage at node 5 will return to its quiescent value.

Figure 7:
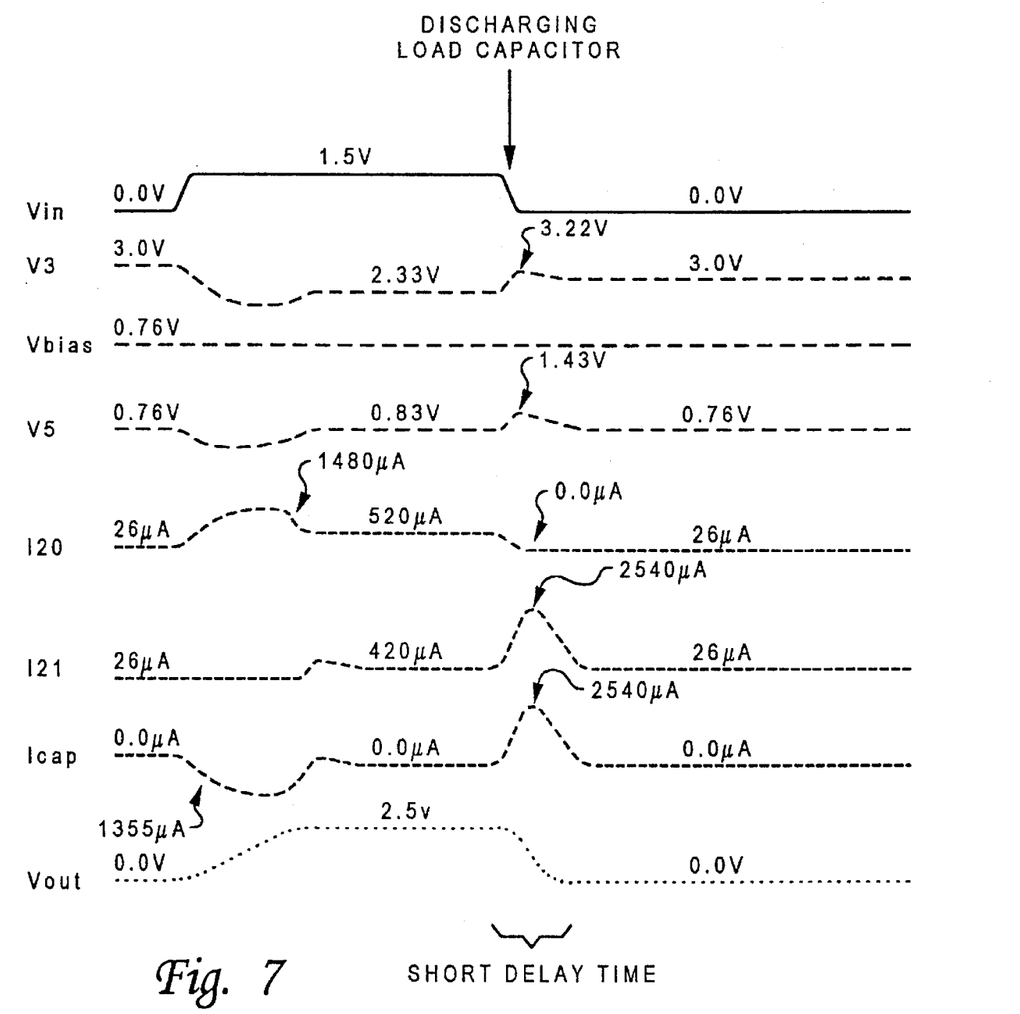
FIG. 7 is a depiction of a series of voltage and current waveform diagrams for various nodes of the output buffer circuit of FIG. 6.

Referring now to FIG. 7, there is depicted a series of voltage and current waveform diagrams for various nodes of the output buffer circuit of FIG. 6. Similar to FIG. 5, the input voltage, $V_{in}$, may range between 0.0 V to 1.5 V and the voltage waveform $V_3$ at node 3 is a response to the input voltage waveform, $V_{in}$. The bias voltage, $V_{bias}$, at the gate of transistor 22 is also a constant voltage of approximately 0.76 V. Note that the voltage waveform $V_5$ at node 5 tracks the voltage waveform $V_3$ at node 3. In addition, the current in transistor 20, $I_{20}$, drops to 0.0 µA when the input voltage, $V_{in}$, is falling such that it does not oppose the rapid discharge of the load capacitor. $I_{21}$ is the current in transistor 21. According to a preferred embodiment of the present invention, the quiescent current within transistor 21 is approximately 420 µA; however, it can rise to approximately 2540 µA when needed for the rapid discharge of the load capacitor. $I_{cap}$ is the current in load capacitor. As shown, $I_{cap}$ also ramps up to approximately 2540 µA during the capacitor discharging period. The output voltage, $V_{out}$, may range between 0.0 and 2.5 volts. By comparing this output voltage waveform, $V_{out}$, with that in FIG. 5, it is obvious that the length of time to discharge the load capacitor is much faster than that of prior art.

Figure 8:
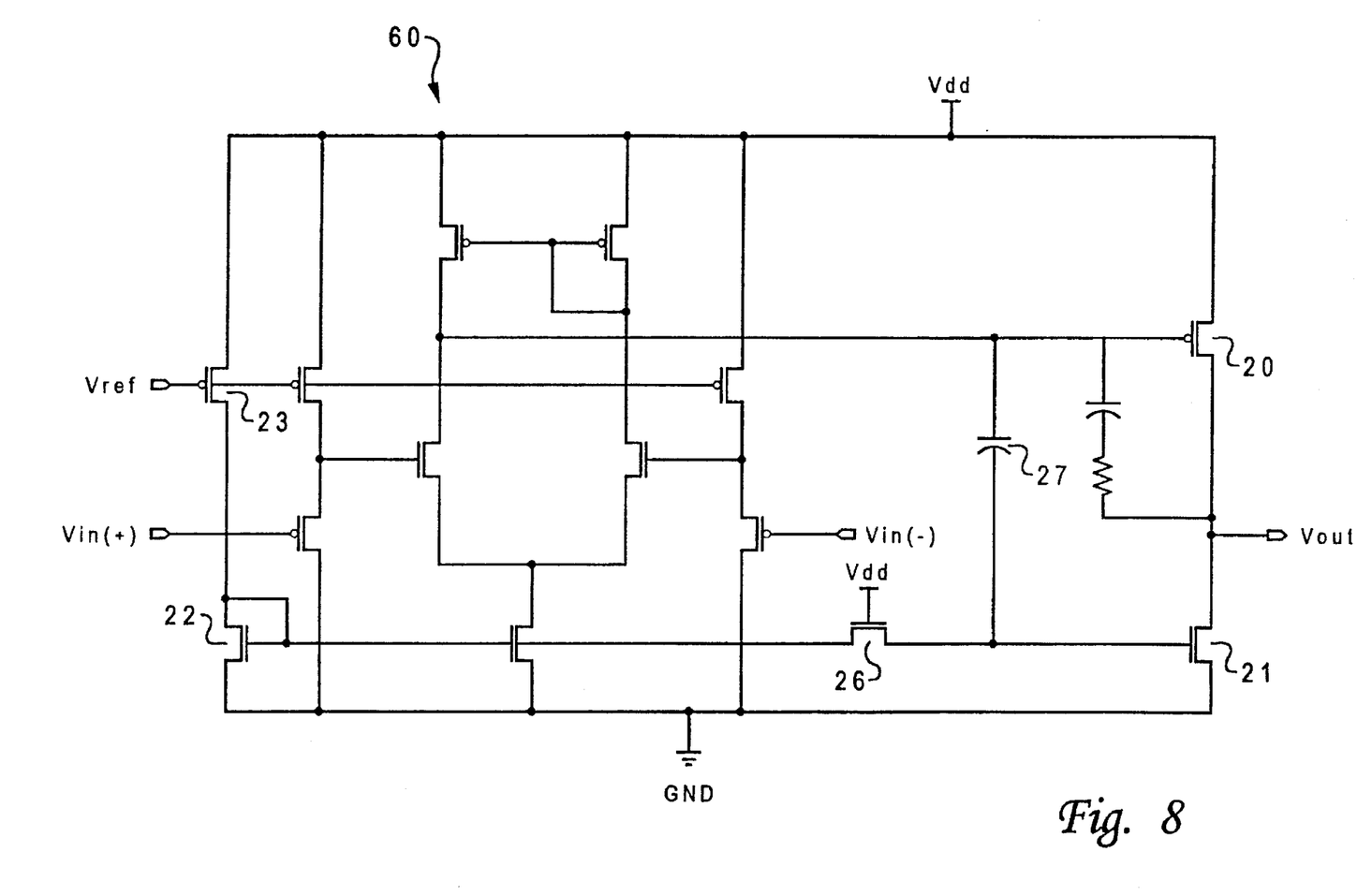
FIG. 8 is a detailed schematic diagram of illustrating how a preferred embodiment of the invention may be utilized.

With reference now to FIG. 8, there is shown a detailed schematic diagram of how a preferred embodiment of the invention may be utilized. As shown, circuit 60 is a complete depiction of an output buffer circuit of FIG. 6. In order to highlight the invention, only the essential elements are labelled in circuit 60 under the same label as in FIG. 6. The unlabelled elements are non-critical to the invention and they are only illustrated as an example to put the present invention in context. The functionality of several, if not all, of these unlabelled elements are quite familiar to those skilled in the art of circuit design such that further explanation is unnecessary, especially when they are not part of the invention. For example, the resistor and capacitor connected in series between the gate of transistor 20 and $V_{out}$ are only utilized for compensation against oscillation at the output and they are not a part of the invention.

As has been described, the present disclosure describes an improved analog output buffer circuit having a high drive capability and yet with a low quiescent power dissipation. Under the present invention, the value of quiescent current is low enough to save power, but at the same time, the output buffer circuit is still capable of rapidly charging and discharging a load capacitor. The RC time constant can be designed to accommodate the amount of charges to be withdrawn from the load capacitor.

While the disclosure has been particularly shown and described with reference to an illustrative embodiment, it will be understood by those skilled in the art that various changes in form and detail may be made therein without departing from the spirit and scope of the disclosure.

What is claimed is:

1. An output buffer circuit having a low quiescent power dissipation and a high current-drive capability, said output buffer circuit comprising:
   a first transistor coupling between a power supply and an output, wherein the gate of said first transistor is connected to an input signal;
   a second transistor coupling between said output and a ground;
   a capacitor coupling between a gate of said first transistor and a gate of said second transistor, wherein voltages at said gate of said first transistor are related to voltages at said gate of said second transistor via said capacitor; and
   a third transistor coupling between said gate of said second transistor and a current source.

2. The output buffer circuit according to claim 1, wherein said first transistor is a p-channel transistor.

3. The output buffer circuit according to claim 1, wherein said second transistor is an n-channel transistor.

4. The output buffer circuit according to claim 1, wherein said third transistor is an n-channel transistor biased in the linear region to behave like a resistor.

5. The output buffer circuit according to claim 1, wherein said current source includes a fourth transistor and a fifth transistor coupling in series between said power supply and said ground, wherein a gate of said fourth transistor is connected to a reference voltage, wherein a gate and a drain of said fifth transistor are connected together.

6. The output buffer circuit according to claim 5, wherein said fourth transistor is a p-channel transistor and said fifth transistor is an n-channel transistor.

7. An output buffer circuit having a low quiescent power dissipation and a high current-driving capability, said output buffer circuit comprising:
   a first transistor and a second transistor coupling in series between a power supply and a ground, wherein a gate of said first transistor is connected to an input signal, wherein an output is located between said first transistor and said second transistor;
   a capacitor coupling between a gate of said first transistor and a gate of said second transistor;
   a forth transistor and a fifth transistor coupling in series between said power supply and said ground, wherein a gate and a drain of said fifth transistor are connected together; and
   a third transistor coupling between said gate of said second transistor and said gate of said fifth transistor.

8. The output buffer circuit according to claim 7, wherein said first transistor is a p-channel transistor and said second transistor is an n-channel transistor.

9. The output buffer circuit according to claim 7, wherein said forth transistor is a p-channel transistor and said fifth transistor is an n-channel transistor.

10. The output buffer circuit according to claim 7, wherein said third transistor is an n-channel transistor biased in the linear region to behave like a resistor.

11. A disk drive comprising:
   a disk mounted for rotation and having burst signals recorded on a surface thereof to provide location information;
   a read/write head mounted for movement over said surface of said disk to read said burst signals;
   at least one peak-hold circuit for receiving said burst signals from said read/write head;
   at least one output buffer circuit for transferring said burst signals from said at least one peak-hold circuit to a corresponding load capacitor, wherein each of said at least one output buffer circuit further includes
      a first transistor coupling between a power supply and an output, wherein a gate of said first transistor is for receiving said burst signals;
      a second transistor coupling between said output and a ground;
      a capacitor coupling between a gate of said first transistor and a gate of said second transistor, wherein voltages at said gate of said first transistor are related to voltages at said gate of said second transistor via said capacitor; and
      a third transistor coupling between said gate of said second transistor and a current source.

12. The disk drive according to claim 11, wherein said first transistor is a p-channel transistor and said second transistor is an n-channel transistor.

13. The disk drive according to claim 11, wherein said third transistor is an n-channel transistor biased in the linear region to behave like a resistor.

14. The disk drive according to claim 11, wherein said current source includes a fourth transistor and a fifth transistor coupling in series between said power supply and said ground, wherein a gate of said fourth transistor is connected to a reference voltage, wherein a gate and a drain of said fifth transistor are connected together.

15. The disk drive according to claim 14, wherein said fourth transistor is a p-channel transistor and said fifth transistor is an n-channel transistor.

* * * * *